United States Patent Office 3,830,943
Patented Aug. 20, 1974

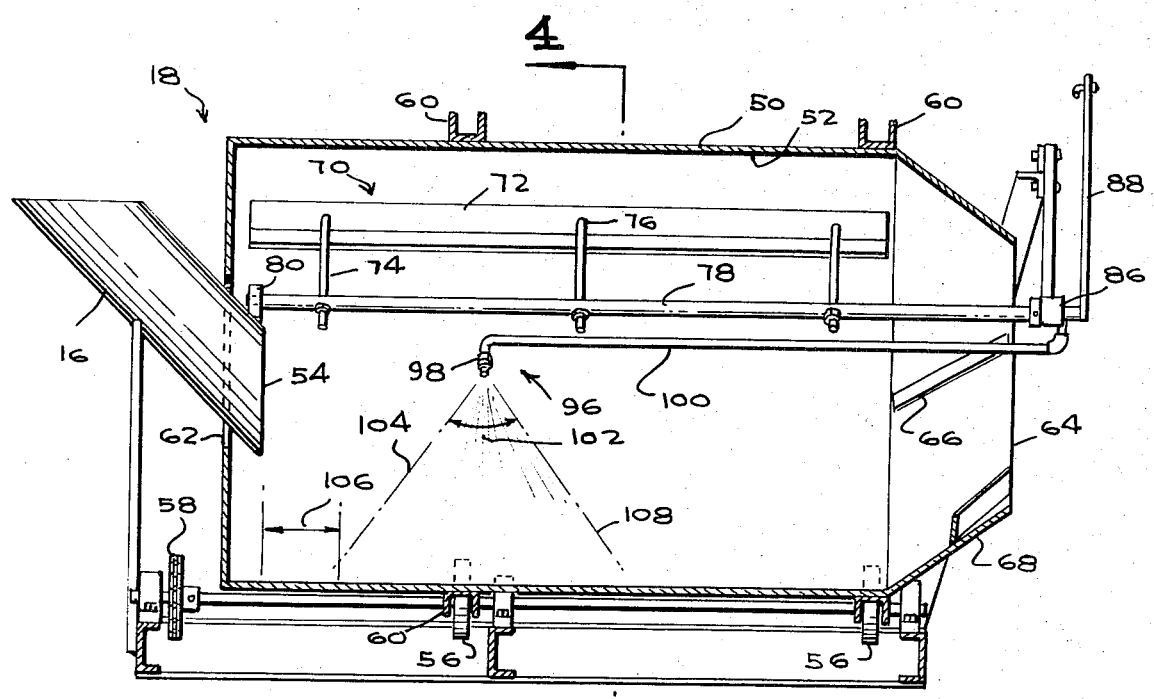
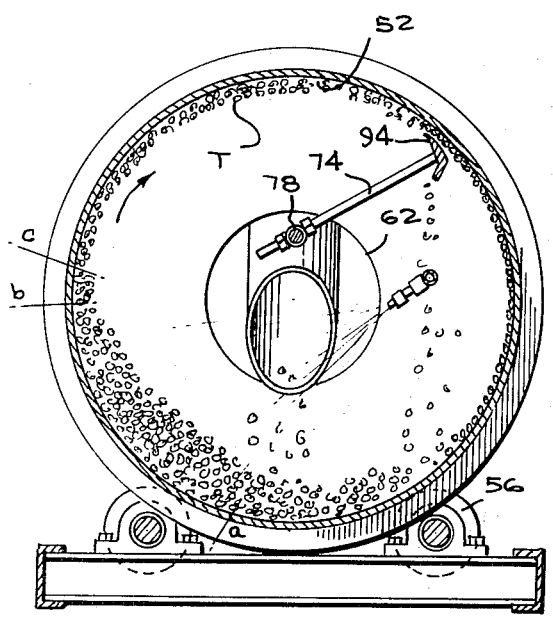
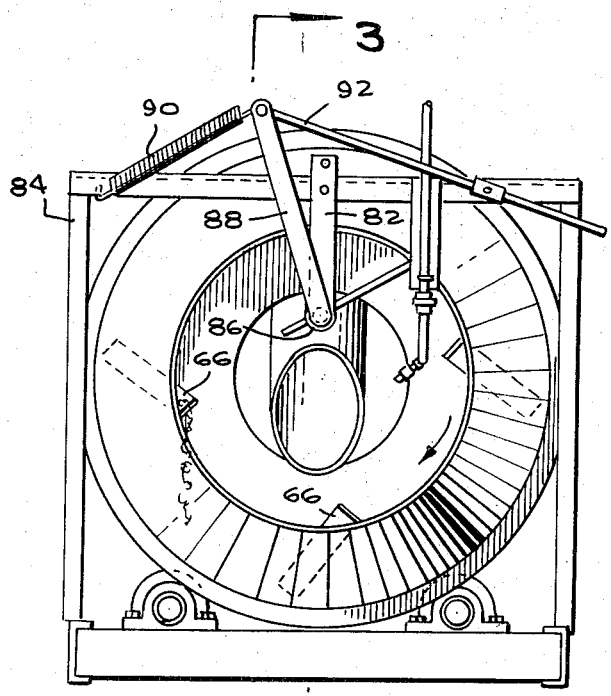

3,830,943
METHOD FOR AGGLOMERATING DRY FOOD
PARTICLES IN A ROTATING DRUM
Veldon Max Hix and Warren J Simon, Idaho Falls, and
Donald Jay Anderson, Blackfoot, Idaho, assignors to
Rogers Brothers Company, Idaho Falls, Idaho
Filed June 14, 1972, Ser. No. 262,524
Int. Cl. 23b 7/02
U.S. Cl. 426—285                                   14 Claims

ABSTRACT OF THE DISCLOSURE

A method for agglomerating particles utilizing a rotating drum in which not greater than 10% of the total volume of the drum is composed of the particles to be agglomerated, spraying the particles in a spray zone with liquid to permit particles of at least a single depth to adhere to the interior surface of the drum and form a traction layer of the particles which upon rotating the drum carries particles up the side in the direction of rotation until they reach a fall back zone. The particles which do not adhere to the traction layer roll back down in the spray zone and adhere to other particles to agglomerate.

BACKGROUND OF THE INVENTION

This invention relates generally to an apparatus and method for agglomerating particles. More particularly, the present invention relates to apparatus and method for agglomerating particles of food, particularly vegetables, and more particularly potatoes.

Instant mashed potatoes have become a very important commercial food item in the last two decades. Generally such instant mashed potatoes are produced in accordance with either of two different procedures which produce products known as flakes or granules. Each of these products possess well known characteristics some of which are advantageous while other characteristics are less desirable.

Potato granules are dehydrated mashed potatoes in powder form that may be quickly and easily formed into mashed potatoes by mixing with hot or boiling liquid. As a convenience food, potato granules have the disadvantage that the reconstituting liquid must be near boiling temperature and that to attain a proper texture, the reconstituted granule must be mechanically whipped. Neither requirement is considered a desirable feature and has lessened the attractiveness of granules as a source of instant mashed potatoes. Granules also suffer from the disadvantage of a high-density and the necessity for packaging in an inert or gas controlled atmosphere which thereby increases the packaging costs.

Potato granules are essentially unicellular and to constitute a useful commercial product, the size of the granules must be limited since large size granules do not absorb moisture as rapidly as the smaller unicellular granules. In the manufacture of granules, it is important to minimize the rupture of potato cells to avoid the release of free starch which produces a sticky or pasty quality to the product. Also, the granulation to avoid graininess or lumpiness in the final product necessitates that the granules be of uniform and unicellular size.

The other well known form of dehydrated potatoes for forming instant mashed potatoes is the dehydrated flake. Dehydrated potato flakes are a form of mashed potatoes which have been dehydrated on a drum dryer when in an essentially single cell thickness. Upon removal from the drum dryer, the dried mashed potato is in a form of a sheet that is broken into flakes. Flakes have a very low bulk density to their shape and size and are undesirable from a packaging standpoint. More importantly, the potato flake cannot be rehydrated in boiling water or even in water in excess of 180° F. without a breakdown in the starch present in the potato flake that would result in a gummy and totally undesirable texture. The potato flake also cannot be whipped without a further breakdown in texture, in fact, mixing is quite critical if a desirable product is to be obtained.

OBJECTS OF THE PRESENT INVENTION

The principal object of the present invention is to provide a method and apparatus for agglomerating a particle in a simple and efficient manner.

The present invention also has as an object the provision of a method and apparatus for producing a reconstitutable potato product suitable for conversion into instant mashed potatoes having taste, texture and quality that compare favorably to freshly prepared mashed potatoes.

Another object of the present invention is for the provison of apparatus and method for the production of an instant mashed potato product having an intermediate, uniform bulk density that reduces packaging costs compared to potato flakes and simplifies volume measurements prior to reconstitution in order to obtain a uniform product.

A further object of the present invention is provision of apparatus and method for the production of an instant mashed potato product that may utilize hot or boiling water and may also be successfully mixed by hand or by using a mechanical mixer.

THE DRAWINGS

These and other objects of the present invention become apparent upon careful study of the following specification and claims including the drawings in which:

FIG. 2 is an end elevational view taken of the discharge end viewing towards the feed inlet end;

FIG. 3 is a side elevational view of the rotating drum with the spray means and scraper positioned for operation;

FIG. 4 is a cross-sectional view taken along lines 4—4 of FIG. 3 and illustrating the fall back zone and spray zone along the circumference of the drum and the position of the scraper as it scrapes only a portion of the traction layer on the interior surface of the drum.

DETAILED DESCRIPTION OF THE APPARATUS

Figure 1:
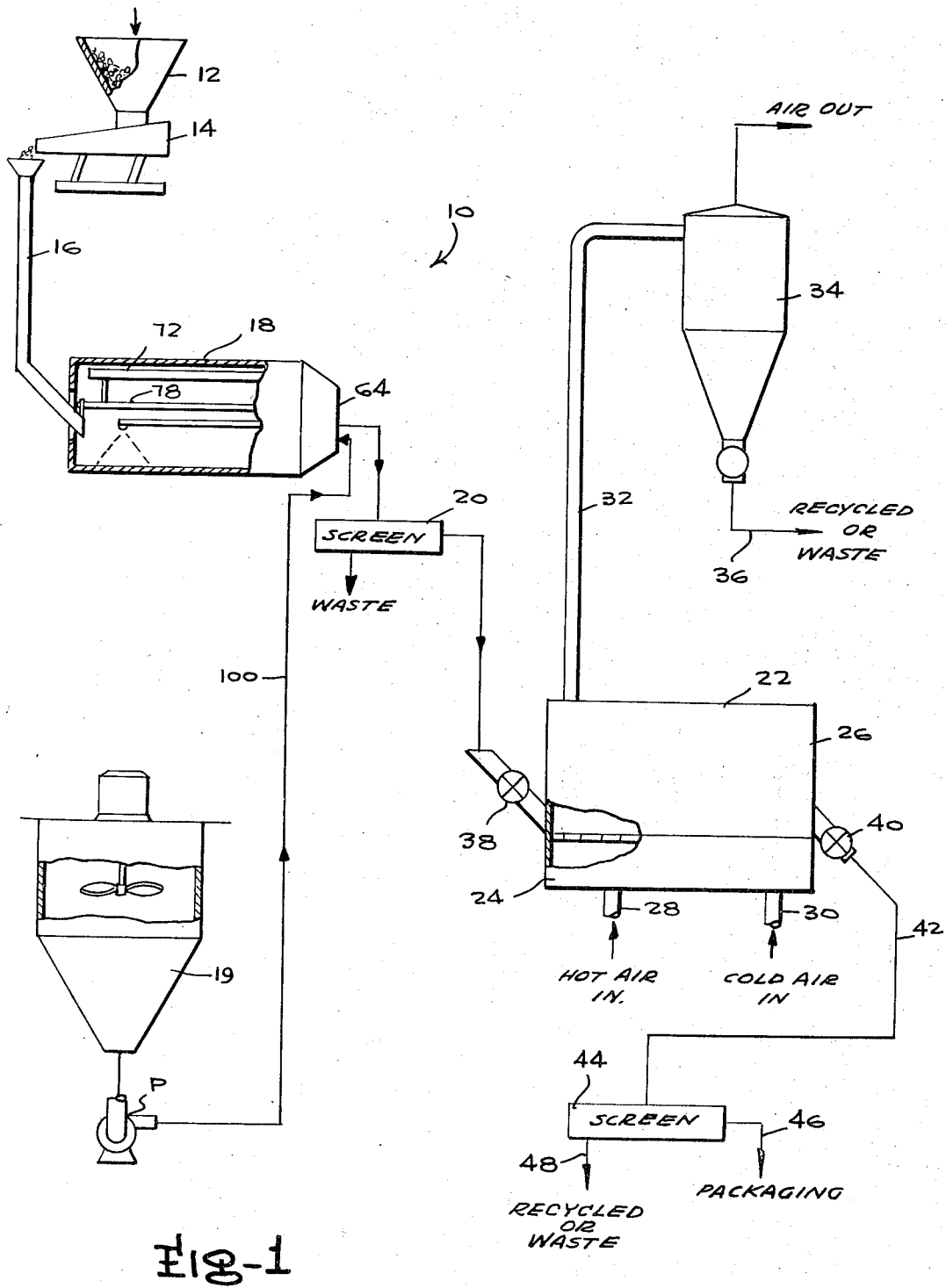
FIG. 1 is a schematic view partly broken away of the complete process apparatus of the present invention.

The process is diagrammatically illustrated in FIG. 1 wherein the numeral 10 generally indicates all of the apparatus for producing the product beginning with potato granules. The granules are added to the hopper 12 that feeds a vibratory belt feeder 14 which is capable of consistently delivering a constant weight per minute of the dry granules to the chute 16 which in turn feeds the agglomerating drum 18 wherein the principal aspects of the present invention reside. Agglomerating drum 18 is disclosed in detail in FIGS. 2 to 4 and will be described in a manner to make clear the unique features. Fluid mixing tank 19 with suitable pump P provided the liquid used in the agglomerating drum.

From the agglomerating drum 18, the agglomerated particles pass on to a vibrating wire screen 20 which preferably, though not necessarily, is provided with three meshes to the inch. Preferably any screen system which will remove particles larger than those that will pass a three mesh sieve is suitable. The oversized particles are either discarded as waste or returned to hopper 12. The agglomerated particles passing through the screen 20 are passed to the dryer 22 which may be any conventional fluid bed dryer having a front heating secetion 24 and a back cooling section 26 maintained by the hot air inlet 28 and the cold air inlet 30. Suitable air conduits are provided to direct the air out through pipe 32 which connects with a conventional cyclone dust collection system 34 for removing the fine particles that may be recycled or sent to waste as shown at 36. The particular dryer used is not critical to the invention but the conventional type used for the manufacture of dehydrated potato granules will perform satisfactorily. This particular dryer may, for instance, be 15 feet long by one foot wide with the first 10 feet for heating and drying and the remaining 5 feet for cooling. Suitable star valves 38 and 40 positioned at the entrance and exit respectively of the dryer control the flow of material through the dryer and maintain a resting bed depth of preferably 2½ to 3 inches. The bed media for this dryer may be fabricated from any of various materials having different designs and configurations such as are commonly used in fluid bed dryers for materials having small particle size. Air flow is not critical but may be maintained at 350 to 450 feet per minute in the cooling section. The air temperature is maintained at 200° F. to 350° F. in the drying section by means of a gas burner and is atmospheric in the cooling section.

The dried agglomerated particles exit at 42 and are screened at 44 with a pair of vibrating metal wire screens. The upper screen may have 10 meshes to the inch while the bottom may have 50 meshes to the inch. The final product at 46 is ready for packaging. Fines or lumps are recycled or sent to waste at 48.

Considering in more detail the agglomerating drum 18, FIGS. 2 through 4 illustrate the inventive features of the drum which produce the agglomerated particles of the present invention.

The drum is preferably composed of an outer shell 50 of stainless steel or other suitable material such as may, for instance, be coated with a food grade epoxy to provide a clean, smooth surface. The interior surface of the coated or stainless steel drum 52 provides contact with the granules entering through feed inlet 54 that is the discharge end of chute 16. The drum is suitably mounted on rollers 56 which are driven by suitable chain drive 58. The rollers are vertically adjustable and mounted within circular channels 60 to guide the rotation of the drum.

The drum, as best shown in FIG. 4, includes a circular opening 62 large enough to accommodate the feed inlet 54.

The outlet end 64 of the drum is provided with a plurality of offset blades 66 which are mounted on the inclined lip 68 of the drum as shown. These blades assist in removing the agglomerated particles from the interior of the drum to the screen 44.

The drum rotation may vary considerably. Preferably the rotation of the drum ranges from 5 to 20 r.p.m. while more preferably a speed of rotation of 15 to 17 r.p.m. as has been used in practice with a 6 foot long 3 foot wide drum. The drum in general should be about twice as long as its diameter. To assist in the passage of the granules through the drum and the removal of the agglomerated particles it is preferable, though not necessary, to have the drum mounted on a slight incline downwardly. For instance, the bottom of the drum 18 may be approximately 3½ inches below the horizontal at the discharge end.

The interior of the drum is provided with a scraper assembly depicted generally at 70. The scraper assembly is composed of a scraper blade 72, a plurality of supporting struts 74 which removably hold the scraper blade 72 at 76 by conventional securing means. The struts are in turn fixed as by bolting to a pivotable rod 78. The rod 78 is journaled in bearing 80 that may be secured to the inlet chute 16 or may be secured through opening 62 to an external member not shown. At the other end, the pivotable rod 78 as may be best seen in FIG. 2 is supported by depending bar 82 secured to the frame member 84 which surrounds the discharge end 64 of the drum. At the end of the bar 82 there is provided a bearing 86 which holds the rod 78 for a pivotal movement. Crank arm 88 fixed to the rod 78 is resiliently urged by spring 90 to a position toward the interior surface of the drum. Control rod 92 acts against the urging of spring 90 to position crank arm 88 and therefore rod 78 in the desired angular position to move scraper blade 72 towards or away from the interior surface 52 of the drum. The scraper blade may also be turned around and the rod 78 in a clockwise direction to contact the opposite side of the drum.

The blade 72 is a stainless steel bar having a sharpened outer edge 94 as best shown in FIG. 4. The edge 94 through the operating structure supporting the rod 78 is designed to maintain a suitable distance between the edge 94 and the surface of the drum 52. Preferably, this spacing has been found to vary between $\frac{1}{32}$ and ¼ inch, more preferably approximately $\frac{1}{16}$ of an inch produces satisfactory results.

Another important feature of the present invention is the spray nozzle assembly 96. As shown in FIGS. 2 through 4, the spray nozzle 96 is composed of a conventional flat atomizing nozzle 98 which preferably is secured to a supply pipe 100 connected to the outlet side of the pump P of the mixer 19.

The nozzle 98 is preferably an atomizing nozzle which will produce droplets sized from 1 to 5 times the particle size of the dry granule. Generally, the dry granule will be of a size not greater than 100 mesh with no minimum. The nozzle is positioned to direct a spray to contact the drum within a spray zone beginning from a point $a$ just above the bottom of the drum to a point $b$ which is below a point $c$ a distance measured on an arc of the circular drum subtended by a central angle of 1°–30°. The spray may fill all or preferably only a part of this spray zone. The distance between point $a$ and $b$ measured on the drum surface is approximately 60° as measured by the central angle. The point $c$ referred to as the fall back point is determined by inspection as will be clear from a discussion of the method of this invention. From fall back point $c$ as a reference, the spray zone $a$ to $b$ is fixed.

The nozzle 98 is preferably a flat atomizing nozzle, that is, one that will produce a flat spray when viewing the drum as in FIG. 3. The flat spray may, for instance, only deposit liquid within a 10°–5° or up to 15° arc measured on the drum surface. The fan angle of the spray as shown at 102 is preferably between 70° and 75° though 5%–20% wider or narrower angle sprays are possible. The spraying of the liquid is preferably along 10% to 75% of the length of the drum as measured along its axis of rotation.

The scraper blade may be at least as long in the axial direction as the spray zone and may extend at least 1.0% of its length and to 25% beyond the spray zone. The spray may then cover preferably approximately 45% to 55% of the length of the drum but may vary in either direction up to 20%. The edge of the spray 104 that is closest to the feed inlet is ideally not closer than 10% of the length of the drum from the feed inlet 54 though this is not critical. More preferably, 13% to 30% of the drum length at incidence of the edge of the spray 104 may separate the feed inlet from the point of contact of the spray 104. This distance noted in FIG. 3 at 106 is at least 20% of the length of the drum. As measured from the point of contact of the trailing edge 108 of the spray, at least 10% of the drum length to the beginning of the lip 68 may be outside the spray range.

The positioning of the spray nozzle within the drum is not critical provided only that the spray on contact is within the spray zone limits $a$ and $b$, as only relatively located for illustration in FIG. 4, when rotation of the drum is clockwise. Of course, with reverse rotation of the drum, the position of points $a$ and $b$ will be reversed and at the opposite side of the drum as viewed in FIG. 4.

DESCRIPTION OF THE METHOD OF THE PRESENT INVENTION

The method of agglomerating particles such as potato granules or other similar materials such as foods, drugs, etc. is carried out essentially in the rotating drum 18. It is important to the present invention that whatever the diameter or length of the drum that the volume of the particles in the drum at any one time constitute not more than 10% of the interior volume of the drum. Preferably, the volume consumed by the particles being agglomerated should be less than 5% and most preferably 2% to 3% of the total volume of the drum. The volume of the drum is measured preferably using only the cylindrical sides. The method of the present invention is intended to be continuous to effect the greater economy of operation. As a continuous operation, the feed rate through the feed inlet 54 must be regulated to maintain the maximum level of 10% of the feed in the drum.

The spraying of the liquid within the drum is an important feature along with the combination effect produced by the scraper bar assembly and rotating drum. Each of these features is important to attain an important rolling action of the particles within the drum and through the spray zone. It is believed that this rolling action of one particle over another particle rather than simply sliding of the particles is important to produce the formation of the agglomerates.

It is believed that as the dry product having a moisture content not greater than 20% and preferably less than 10% enters the drum, it is immediately carried up into the area of the spray between points $a$ and $b$ where the moisture from the spray attracts dry particles. Spray zone $a-b$ may vary up to 60° but is not critical. The particles adhere to the surface 52 of the drum and may be from one to several particles thick as the drum revolves. These particles adhering to the drum form a traction layer T which because of their inherent adhesivity, tend to pick up and carry along additional dry particles up along the wall in the direction of rotation of the drum. If these dry, essentially single particles ride up the side of the drum, there is a point where they will first begin to fall back— when the gravitational force vector exceeds the sum of the adhesive force vector between the particles and those closer to the drum surface and the centrifugal force vector due to the rotation of the drum. This first or initial fall back point is depicted at $c$ and will always be above the spray zone $a-b$ by a 1°–5° arc of a central angle and may be as much as up to 30°. This fall back point falls within a narrow zone and the point can be precisely and easily determined by inspection. The exact location will vary but can, by controlling the speed of rotation and the weight of liquid per unit of dry particles, be made to occur within 15° above and 30° below the horizontal. Thus the range of the location of the fall back point is about 45° as measured by a central angle. Any combination of these factors which produces fall back will also result in the rolling action that is necessary to the agglomeration according to the present invention. The weight of liquid in the spray per weight of dry particles should be .27–.37 but may range between .20–.45. This is designed to produce a moisture content in the preferred range of 27%–30% upon leaving the drum.

It is believed that the agglomeration of the particles is greatly enhanced by reason of the particles moving up and falling back. The smaller particles tend to move up farther because of their lightness and they will reach the highest point attainable before falling back. This is point $c$. As the particles move along toward the discharge end of the drum the particles will become larger and will not ride up as high before falling back. This will not change the fall back point which is already set by the lightest particles.

The rolling action of the particles down from the fall back point continues in the spray zone between $a$ and $b$ and because of this rolling action presenting new surfaces to meet the spray, the particles are caused to take up more and more moisture. Consequently, more dry particles are able to adhere to the high moisture containing particles to form agglomerates that may be of a size between 3 and 20 particles. The rolling action continues and the size of a particular particle increases while the particle is rolling down within the area of point $a$ and $b$ and will continue to pick up further dry particles until it cannot supply further moisture and the outer particles are dry, thus not having any further adhesive properties.

It has been found that the volume of the particles within the drum has a pronounced effect upon the size of the agglomerated particles produced. When the quantity of particles exceeds the 10% volume limitation the particles tend to slide as a mass within the drum rather than to roll to continually expose a new outer surface of each particle to the spray resulting in less liquid pick up. Thus with a larger volume of particles in the drum than is desirable a few particles within the spray zone become too wet on the surface that is presented to the spray and tend to cause clumps rather than the desirable, almost spherically shaped agglomerates having from 3 to 20 particles each.

Particles that are sufficiently adhesively secured to the surface of the drum or to each other may be carried up beyond point $c$ towards the vertical. The outer surface of these particles form the traction layer T and are too dry to support further adhesion of another layer of particles. It is for this reason that the scraper blade 94 operates to scrape off the top layer or layers of the traction layer T. As may be best seen in FIG. 4, the position of the scraper blade is such as to space the edge 94 from the surface of the drum. It has been found that a spacing of $\frac{1}{32}$ to $\frac{1}{4}$ inch or more preferably $\frac{1}{16}$ inch will automatically remove the dryer outer layer of particles and instantly convert the remaining portion layer of the traction layer into a more adhesive layer by reason of the exposure of the underlying layers of particles having a greater moisture content. The moisture content has been found to generally increase towards the surface of the drum. Thus it may be stated that the moisture content of the traction layers is controlled by the scraper blade, it being understood that the closer the scraping to the surface of the drum 52 the wetter the traction layer and therefore the greater adhesive capability possible between the traction layer and the dry particles. Thus the scraper bar in addition to maintaining the traction layer at the proper thickness also maintains the moisture levels of the traction layer such that it will be adhesive to the dry granule as the drum rotates up through the spray zone. If the moisture level of the traction layer is too low, the particles will not adhere to the drum but will drop off; while if the moisture content of the traction layer is too high, large clumps will form and because of their weight will drop off.

Dry particles which have attached themselves to the traction layer are removed by the action of the scraper bar and as shown in FIG. 4 drop to the bottom of the drum where they again move up into the spray area and take on more moisture and, subseqeuntly, other dry particles to become agglomerated.

It is desirable, though not critical to the present invention, that the scraper blade be positioned such that the particles scraped off will fall into the area of the drum from which they will be moved up into the spray area and pick up more liquid and more dry granules. As shown in FIG. 4, the scraping zone is essentially diametrically opposed from the spray zone and particles that have been scraped off the traction layer fall towards the bottom of the drum from whence they are carried by the clockwise rotation of the drum up to the beginning of the spray zone at point $a$. The scraper may be positioned vertically or even on the same side of the drum as the spray zone.

The liquid utilized to spray the particles is not critical to the present invention but may, if potato granules are used as the raw material and instant mashed potatoes are the desired final product contain, in an aqueous medium, milk solids in amounts from 0% to 10% dry weight, optional artificial color and flavors from 0.2–1% by weight, vegetable oil from 0% to 2% dry weight. The vegetable oil is used to improve the agglomeration and enhance the mouth feel of the finished product. Finally, vitamins, particularly vitamin C may be used as an additive to enhance the nutritional quality of the product. Levels of 0–60 mg. per ounce of dry product have been successfully used.

EXAMPLE

A typical example of the present invention is as follows:

Dehydrated potato granules having a moisture content of 7.2% were fed into the agglomerator drum 18 where they were sprayed with a liquid at a rate of 0.172 gallons per minute. The liquid contained the following ingredients in water in amounts sufficient to give the indicated percentages of the finished product.

|  | Percent |
|---|---|
| Non-fat dry milk | 5 |
| Artificial color (titanium dioxide) | 0.2 |
| Artificial flavor (butter flavor) | 0.002 |

The feed was added at a rate of 5 pounds per minute but may vary between 2½ and 6 pounds per minute. The drum is 72 inches long and 3 feet in diameter and is rotated at a speed of 16 r.p.m. The spray nozzle is a jet flat atomizing nozzle providing a horizontally flat spray field at an angle of 73° from the nozzle to contact the drum at about 30° below the horizontal. The orifice of the nozzle is 0.028 inches but a variation of .001–.002 inches greater or smaller diameter would have no significant effect. If the orifice is appreciably larger than .028 inches, the spray droplets are larger and produce larger agglomerates. An orifice size that produces droplets twice the size of the 100 mesh maximum size particles was used. The spray nozzle was positioned at a point 28 inches from the inlet end of the drum and 26 inches from the opposite side of the drum. The spray produced is approximately 35½ inches wide leaving a space of 10 inches from the feed end to the feed side 104 of the spray and 26½ inches from the end of the cylindrical drum to the point of contact with the discharge side 108 of the spray. The particles rolled up on the traction layer and began to fall back at approximately 15° below the horizontal (point c) and the particles would continue to roll down meanwhile picking up additional moisture from the spray area as they passed through the spray until the agglomerated particles at the exit of the drum had a moisture content of approximately 29%. A moisture content at discharge is not critical and may vary from 25%–33%.

Approximately 2% of the particles leaving the drum were retained on a three mesh screen and were discarded while the remainder passed into the dryer. The particles exited from the dryer in 8 minutes at a temperature of 75° F. when cooled with atmospheric temperature air. The moisture content of the final product was 6.7%.

These particles were screened, 8% were retained on a ten mesh screen and were crushed and recycled to the granule feeder while 10% passed through a 55 mesh screen and were also recycled to the granule feeder. Screen analysis of the product passing through the 10 mesh screen and retained on the 55 mesh screen showed the following results:

|  | Percent |
|---|---|
| On U.S. 20 screen | 17.8 |
| On U.S. 40 screen | 59.7 |
| On U.S. 60 screen | 16.0 |
| Through U.S. 60 screen | 6.4 |

The bulk density was 0.56 grams per cc.

In an actual test, one cup of the finished product thus produced was added to 2½ cups of boiling water and ½ teaspoon of salt and mixed lightly with a fork to produce a mashed potato superior in color, flavor and texture.

We claim:

1. A method for agglomerating dry food particles comprising:
feeding said particles having a moisture content not greater than 20% into one end of a rotating drum, maintaining a volume of particles in said drum of not greater than 10% of the interior volume of said drum, spraying said particles with an aqueous liquid to permit at least a single depth of said particles to adhere to the interior surface of said drum and form at least a part of a traction layer of said particles, rotating said drum along a substantially horizontal axis at a speed sufficient to create a point of fall back of said particles not adhering to said traction layer at a point on the interior of the drum below the vertical and above the point of contact of said spraying with said drum, rolling said nonadhering particles relative to said traction layer as the drum rotates to agglomerate said particles and removing said agglomerated particles from the other end of said drum.

2. The method of claim 1 including:
scraping a portion of said traction layer from said drum above the fall back zone to expose an inner moistened layer of said particles adhering to the drum surface, said inner moistened layer having greater adhesiveness for particles than those particles scraped from said traction layer.

3. The method of claim 1 including:
spraying said liquid upon said particles below the fall back zone, said inner moistened layer having greater adhesiveness for particles than those particles scraped from said traction layer.

4. The method of claim 1 including:
spraying said liquid upon said particles in a spray zone within an arc measured upon the drum surface and subtended by a central angle of up to about 60°.

5. The method of claim 1 including:
spraying said liquid upon said particles along 10%–75% of the length of said drum measured along its axis of rotation.

6. The method of claim 1 including:
scraping a portion of said traction layer from said drum above the fall back point and in a zone diametrically opposed to said spray zone to expose an inner moistened layer of said particles.

7. The method of claim 1 including:
spraying said liquid at a point below the fall back point as measured on an arc of the surface of the drum subtended by a central angle of at least 2°.

8. The method of claim 1 including:
scraping a portion of said traction layer from said drum above the fall back point to expose an inner moistened layer of said particles adhering to the drum surface, said inner moistened layer having greater adhesiveness for particles than those particles scraped from said traction layer; and
spraying said liquid upon said particles below the fall back point, said inner moistened layer having greater adhesiveness for particles than those particles scraped from said traction layer.

9. The method of claim 2 including:
spraying said liquid upon said particles in a spray zone within an arc measured upon the drum surface and subtended by a central angle of up to about 60°.

10. The method of claim 1 including:
spraying said liquid upon said particles below the fall back point, said inner moistened layer having greater adhesiveness for particles than those particles scraped from said traction layer; and
scraping a portion of said traction layer from said drum above the fall back point and in a zone diametrically opposed to said spray zone to expose an inner moistened layer of said particles, said inner moistened layer having greater adhesiveness for particles than those particles scraped from said traction layer.

11. The method of claim 1 including:
spraying said liquid upon said particles in a spray zone within an arc measured upon the drum surface and subtended by a central angle of about 60°; and
scraping a portion of said traction layer from said drum above the fall back point and in a zone diametrically opposed to said spray zone to expose an inner moistened layer of said particles, said inner moistened layer having greater adhesiveness for particles than those particles scraped from said traction layer.

12. The method of claim 1 including:
scraping a portion of said traction layer from said drum above the fall back point to expose an inner moistened layer of said particles adhering to the drum surface, said inner moistened layer having greater adhesiveness for particles than those particles scraped from said traction layer;
spraying said liquid upon said particles below the fall back point, said inner moistened layer having greater adhesiveness for particles than those particles scraped from said traction layer; and
spraying said liquid upon said particles in a spray zone within an arc measured upon the drum surface and subtended by a central angle of up to about 60°.

13. The method of claim 12 including:
spraying said liquid at a point below the fall back point as measured on an arc of the surface of the drum subtended by a central angle of at least 2°.

14. The method of claim 1 wherein said particles are composed of potatoes and said liquid is aqueous.

References Cited

UNITED STATES PATENTS

| | | | |
|---|---|---|---|
| 3,186,687 | 6/1965 | Askew | 425—222 |
| 3,348,262 | 10/1967 | Heran | 425—222 |
| 3,353,208 | 11/1967 | Fergus | 425—222 |
| 3,406,426 | 10/1968 | Pabst | 425—222 |
| 3,565,636 | 2/1971 | Hutchings | 23—313 |
| 3,597,361 | 8/1971 | Sumner | 23—313 |
| 3,622,355 | 11/1971 | Beck | 99—207 |

WILBUR L. BASCOMB, JR., Primary Examiner

M. G. MULLEN, Assistant Examiner

U.S. Cl. X.R.

23—313; 425—222; 426—453